Sept. 22, 1931.   A. K. KUSEBAUCH   1,824,021
WRIST PIN LOCKING MECHANISM
Filed May 20, 1930

INVENTOR
ANTON K. KUSEBAUCH
BY *Wm. H. Cady*
ATTORNEY

Patented Sept. 22, 1931

1,824,021

UNITED STATES PATENT OFFICE

ANTON K. KUSEBAUCH, OF BELLEVUE, PENNSYLVANIA, ASSIGNOR TO THE WESTINGHOUSE AIR BRAKE COMPANY, OF WILMERDING, PENNSYLVANIA, A CORPORATION OF PENNSYLVANIA

WRIST PIN LOCKING MECHANISM

Application filed May 20, 1930. Serial No. 453,882.

This invention relates to means for securing piston or wrist pins to the pistons of fluid compressors, explosion engines, or the like.

The principal object of my invention is to provide improved means for locking a piston or wrist pin to a piston which will facilitate the removal and replacement of the pin.

Other objects and advantages will appear in the following more detailed description of the invention.

Figure 1:
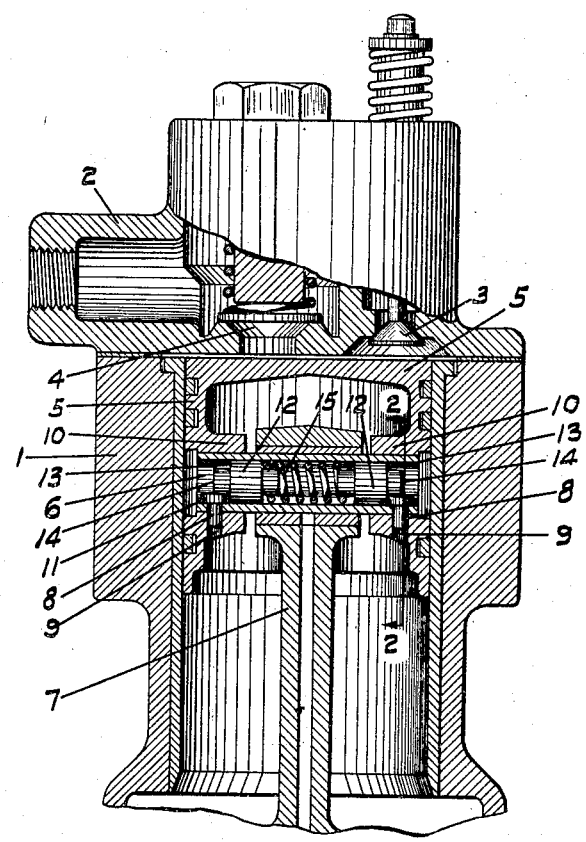
Figure 2:
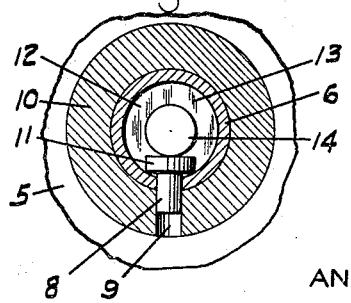

In the accompanying drawings; Fig. 1 is a part sectional view of a portion of a fluid compressor embodying my invention, and Fig. 2 is an enlarged detail sectional view taken on the line 2—2 of Fig. 1, the connecting rod being omitted.

In the drawings, my invention is shown embodied in a fluid compressor for illustrative purposes only. The compressor shown may be of the usual type and may comprise a casing having a cylinder section 1 on which is mounted the compressor head 2, in which the usual inlet and outlet valves 3 and 4 respectively are operatively mounted.

Contained in the cylinder section 1 is the usual piston 5, in which is mounted a tubular wrist pin 6. On this wrist pin there is mounted to oscillate, one end of the usual connecting rod 7, the other end of the connecting rod being operatively connected in the usual manner to a crank shaft (not shown).

The wrist pin 6 is secured to the piston 5, against longitudinal and oscillatory movement, by pins 8, each of which extends through an opening in one end of the wrist pin into engagement with the piston 5 within an opening 9 in an annular wrist pin boss 10 of the piston. Each of the securing pins 8 is provided with a head 11, the under side of which, when the pin is in its proper securing position, rests on the interior surface of the wrist pin.

Mounted in the wrist pin 6 and slidable longitudinally thereof are spaced plungers 12, each having a shoulder 13 which is adapted to engage the edge of the head 11 of one of the securing pins 8, and having an end extension 14 which is adapted to extend over the head 11 and prevent the pin from being accidentally moved out of its proper securing position. These plungers are constantly urged into locking engagement with the heads 11 of the securing pins by the pressure of a spring 15 also contained in the pin.

It will be seen that when the plungers 12 are in engagement with the heads 11, the securing pins are effectively locked in their proper securing positions.

In assembling, the wrist pin 6 is first mounted in the piston, so that the securing pin openings of the wrist pin register with the openings 9 in the bosses 10 of the piston, then from the interior of the wrist pin one of the securing pins is inserted in the registering openings in the wrist pin and the piston. Now, from the opposite end of the wrist pin the plungers 12 and spring 15 are inserted in the pin. The shoulder 13 of the plunger first inserted stops against the head 11 of the securing pin 8. The plunger last inserted is now forced inwardly against the pressure of the spring 15 until the end of the extension 14 is beyond the opening for the reception of the other securing pin 8. The second securing pin is now inserted, and when the inwardly directed pressure on the plunger is relieved, the pressure of the spring will move the plunger outwardly into locking relation with the securing pin 8 which was last inserted.

To permit the removal of a securing pin, the plunger cooperating therewith is forced inwardly against the pressure of the spring 15 until the extension 14 of the plunger is free of the head 11 of the securing pin, and while the plunger is maintained in this position the pin may be removed.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination with a piston, of a wrist pin mounted therein, a pin for securing said wrist pin to the piston, means contained in said wrist pin for retaining said securing pin in its securing position, and a spring for maintaining said means in its pin retaining position.

2. The combination with a piston, of a wrist pin mounted therein, a pin for securing said wrist pin to the piston, a plunger engaging said pin, an extension on said plunger retaining said pin in its securing position and yieldable means for normally maintaining said plunger in engagement with said securing pin.

3. The combination with a piston, of a wrist pin mounted in said piston, spaced pins securing said wrist pin to said piston, spaced members mounted in said wrist pin for retaining said pins in their securing positions, and a spring in said wrist pin urging said members into their pin retaining positions.

4. The combination with a piston, of a wrist pin mounted in said piston, spaced pins securing said wrist pin to said piston, spaced members mounted in said wrist pin for retaining said pins in their securing positions, and a spring in said wrist pin urging said members into their pin retaining positions, either of said members being movable out of its pin retaining position by pressure in excess of the pressure of said spring.

In testimony whereof I have hereunto set my hand, this 16th day of May, 1930.

ANTON K. KUSEBAUCH.